Sept. 26, 1967   H. G. WHITEHOUSE   3,343,489
SAFETY FOR PRESSURE ARMED ROCKET FUZE
Filed Feb. 14, 1967

INVENTOR,
Howard G. Whitehouse

BY: Harry M. Saragovitz,
Edward J. Kelly &
Herbert Berl         ATTORNEYS.

United States Patent Office 3,343,489
Patented Sept. 26, 1967

3,343,489
SAFETY FOR PRESSURE ARMED ROCKET FUZE
Howard G. Whitehouse, Garden Grove, Calif., assignor, by mesne assignments, to the United States of America as represented by the Secretary of the Army
Filed Feb. 14, 1967, Ser. No. 616,448
6 Claims. (Cl. 102—49.6)

ABSTRACT OF THE DISCLOSURE

A safety device for a pressure sensitive fuze in a rocket intended to be armed while in flight, wherein a heat insulated casing encloses the igniter assembly to prevent accidental or abnormal ignition and will only shatter when intentionally ignited from within for the purpose of admitting the combustion gases to the expansion cup which in turn is expanded by the increasing pressure of the gases to release the holding pin from an unarmed position and permits the pin to move to an armed position by the setback force of the rocket in flight.

---

This application is a continuation-in-part of the application of Howard G. Whitehouse, Ser. No. 108,959, filed May 9, 1961 for a "Rocket Motor Igniter" and now abandoned.

This invention generally pertains to a means for providing safety for pressure armed rocket fuzes under conditions where the rocket propellant is ignited accidentally. The device consists of a heat insulated igniter at the front of the rocket motor chamber which prevents the motor pressure from being transmitted to a pressure sensitive fuze unless the motor has been initiated by the igniter in the normal manner.

Heretofore rockets, particularly of the bazooka type, required manual prefiring operations, prior to launching. For instance, it was necessary to remove a safety wire or a safety pin. The old type of prefiring operation on a fuze is often considered objectionable because, (1) it increases the firing time, (2) it reduces the functioning reliability since the operator may either not perform the operation or he may do it incorrectly, (3) the design of a prefiring mechanism usually requires the use of an opening in the outer casing of the fuze of the projectile for access to the part to be removed, which inherently introduces undesirable waterproofing problems.

Even fuzes requiring no prefiring operations may have associated safety problems. In the event of accidental ignition of the rocket motor, rocket flight may occur prematurely since rocket projectiles as opposed to gun projectiles do not need a gun or launcher to initiate proper flight. Arming and subsequent functioning of the fuze would consequently occur.

It is an object of this invention to arm the fuze of a rocket warhead while in flight.

It is another object to arm the fuze of a rocket warhead through direct operation of the rocket motor igniter.

It is a further object of this invention to provide means so that the fuze can only be armed when the rocket motor ignition occurs through an igniter assembly.

The detailed construction of this safety device may be more easily understood by reference to the drawing in which.

Figure 1:
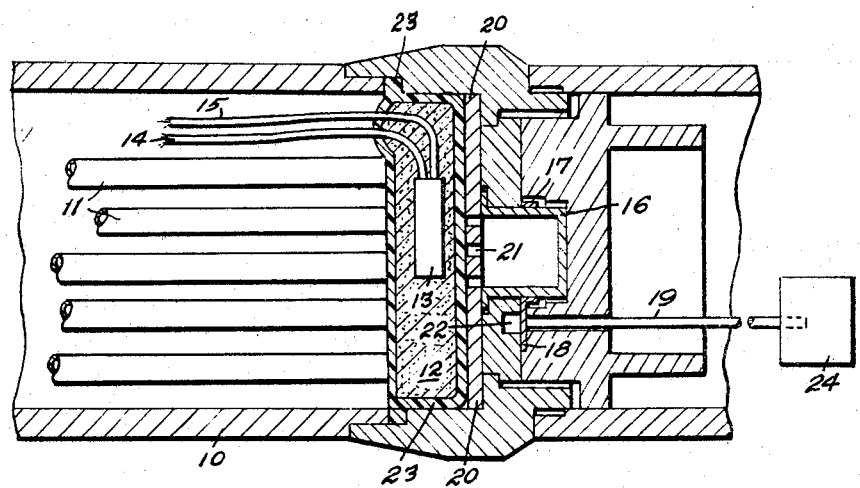
FIGURE 1 is a longitudinal section of the safety device.
Figure 2:
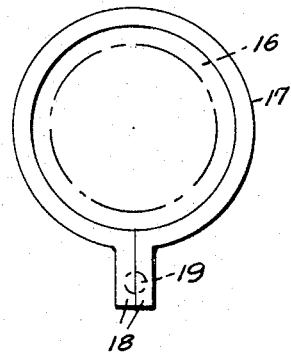
FIGURE 2 is an enlarged view of the retaining ring in normal position with the cup and pin shown in broken lines.

Referring particularly to FIGURE 1 of the drawing which shows the casing 10 of the rocket motor having propellant grains 11, the forward ends of which are provided with an igniter 12 containing a squib 13 connected to a firing circuit by the wires 14 and 15. Adjacent to the squib 13 and in the center of the motor casing 10 is an expansion cup 16 made of a soft metal such as brass and around which is a split retaining ring 17 having flanges 18 extending from the free ends of the ring as shown in FIGURE 2. One end of the release pin 19 maintains the warhead fuze 24 of the rocket in an unarmed position and the other end rests on the flanges 18 of the retaining ring 17. Inserted between the igniter assembly and the expansion cup 16 is a baffle plate 20 having communicating ports 21 therethrough which permit the gases from the igniter assembly and propellant to pass into the expansion cup and build up the pressure necessary to expand the cup 16 and the retaining ring 17.

The squib 13 and the igniter 12 are enclosed in a heat insulated casing 23 which is maintained against the baffle plate 20, thereby sealing the ports 21 until the case is shattered by the igniter 12. The squib 13 and the igniter 12 are hereinafter referred to as the igniter assembly. While this assembly is designed to initiate arming of a pressure sensitive member, namely, the expansion cup 16, it is also designed to prevent actuation of such a pressure armed fuze in any other manner than the shattering of the casing 23 by the igniter 12 of the assembly. The heat insulated casing 23 is designed so that regardless of the heat transmitted by any other means such as dump fire or accidental ignition of the rocket motor, the heat insulation provided by the casing will prevent ignition of the igniter assembly.

The heat insulating material utilized for the casing 23 consists of polyethylene plastic and was tested by subjecting polyethylene vials loaded with black powder, to pressures and temperatures simulating those found in a short burning rocket such as the 3.5″ bazooka.

Figure 3:
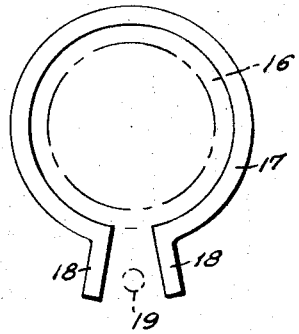
FIGURE 3 is an enlarged similar view of FIGURE 2 after the cup has expanded and spread the retaining ring.

In the operation, the rocket 10 is normally fired by the squib 13 initiating the electric igniter 12 which shatters the casing 23 to open the ports 21 and in turn fires the propellant grains 11 of the rocket motor. The gases from the igniter assembly and the propellant pass through the ports 21 of the baffle plate 20 into the expansion cup 16. The release pin 19 is connected at the forward end to the fuze mechanism 24 in a holding position and the other end of the pin rests on the flanges 18 of the retaining ring 17 as shown in FIGURE 2, thereby maintaining the rocket fuze 24 in a safety or unarmed position. However, when the cup 16 expands due to the internal pressure built up by the burning igniter and propellant gases, the expansion of the cup also expands the retaining ring 17 causing the flanges 18 of the ring to spread apart as shown in FIGURE 3. The spreading of the flanges 18 frees the pin 19 which will only move backward by the setback force of the rocket while in flight into the recess 22 and provides an additional safety means for the device. Such rearward movement of the pin removes the safety from the rocket fuze 24 and puts the rocket fuze in an armed condition while in flight.

This safety device not only eliminates the disadvantages of manual pre-firing, but also holds the rocket fuze in an unarmed condition if the rocket propellant is accidentially ignited. In case of accidental initiation, as could occur in an ammunition fire, the insulating material of the casing 23 surrounding the ignition powder creates a sufficient heat barrier to prevent ignition powder heat conduction through the case 10 of the rocket. Even if the propellant-grains 11 are ignited by an accidental fire, the insulating material of the casing 23 would prevent ignition of the igniter powder. This is absolutely necessary for the arming of the rocket fuze as the insulated casing 23 would continue to seal the ports 21 of the baffle plate 20 and prevent the rocket motor gases from entering the pressure sensitive element 16 and thereby prevent the arming of the rocket fuze.

Thus, the device is a safety against fire and water damage while on the ground and will remain unarmed, whether on the ground or upon accidental ignition of the propellant, since no gases will reach the pressure sensitive member and the release pin will continue in its retaining position.

Having particularly described the invention, what is claimed is:

1. A safety device for a rocket comprising a rocket having a warhead fuze, a rocket motor, an igniter assembly for the motor, a squib within the igniter assembly, a heat-insulated casing containing the ingniter assembly adapted to seal said assembly from accidental ignition, a release pin normally holding directly said warhead fuze in an unarmed position, expandable means supporting the release pin in the holding position, said insulated casing adapted to shatter only by ignition of the igniter assembly from within to permit the combustion gases to enter said means and said means expanded by the pressure of of the combustion gases to free the release pin for movement from the unarmed position.

2. A safety device for a rocket comprising a rocket having a warhead fuze, a rocket motor, an igniter assembly for the motor, a squib within the igniter assembly, a heat insulated casing containing the igniter assembly adapted to seal said assembly from accidental ignition, a release pin normally holding directly said warhead fuze in an unarmed position, a split retaining ring maintaining said release pin in the holding position, expandable means within said ring adapted to spread said split ring, said insulated casing adapted to shatter only by ignition of the igniter assembly from within to permit the exhaust gases to enter said means and said means expanded by the pressure of the exhaust gases to spread said retaining ring and free the release pin for movement from the unarmed position.

3. A safety device for a rocket comprising a rocket having a warhead fuze, a rocket motor, an igniter assembly for the motor, a squib within the igniter assembly, a heat-insulated casing containing the igniter assembly adapted to seal said assembly from accidental ignition, a cylindrical cup with an expandable periphery having the opening of the cup facing the igniter assembly, a baffle plate interposed between the cylindrical cup and the insulated casing containing the igniter asembly, said baffle plate provided with through ports open on the cup side and sealed on the side of the igniter asembly, a release pin normally holding directly said warhead fuze in an unarmed position, a split retaining ring around the expandable periphery of said cup maintaining said release pin in a holding position, said insulated casing adapted to shatter only by ignition of the igniter assembly from within intended to make the rocket airborne and permit the passage of the combustion gases through the baffle plate to expand said cup, said ring spread by the expansion of the cup due to the pressure of the gases from the igniter assembly and the burning propellant to free the release pin and said release pin moved from the unarmed to the armed position of the warhead fuze by the setback force of the rocket in flight.

4. A safety device as claimed in claim 3, wherein the split retaining ring is fitted with flanges on the free ends, said flanges being normally together and supporting said release pin in a holding position, the flanges of said ring adapted to be forced apart by the expansion of said cup to free the release pin.

5. A safety device for a rocket comprising a rocket motor having a warhead fuze, a propellant for said motor, means for maintaining said warhead fuze in an unarmed condition and adapted to be activated only by combustion gases, an igniter assembly for the rocket motor, a heat-insulated casing for the igniter assembly to prevent accidental ignition, said casing also sealing access to said means to permit activation thereof only by combustion gases, said casing upon intentional ignition adapted to shatter and admit combustion gases to said means and said means actuated by the pressure of said gases to arm the warhead fuze.

6. A safety device for a rocket comprising a rocket motor having a warhead fuze, a propellant for said motor, a release pin maintaining said warhead fuze in an unarmed condition, pressure sensitive means holding said release pin and adapted to be activated only by combustion gases, an igniter assembly for the rocket motor, a heat-insulated casing enclosing said igniter assembly to prevent accidental ignition, said casing also sealing access to said pressure sensitive means to permit activation thereof only by combustion gases, said casing adapted to shatter only by ignition from within and admit combustion gases to the pressure sensitive means, said pressure sensitive means expanded by the pressure of said gases to free said release pin and said release pin moved to arm the warhead fuze only by the setback force of airborne rocket to provide an additional safety.

References Cited
UNITED STATES PATENTS

| | | | |
|---|---|---|---|
| 2,704,033 | 3/1955 | Koeper et al. | 102—49.6 |
| 2,918,870 | 12/1959 | Meister | 102—81 X |
| 2,928,346 | 3/1960 | Grimes | 102—76 X |

SAMUEL W. ENGLE, *Primary Examiner.*

BENJAMIN A. BORCHELT, *Examiner.*

V. R. PENDEGRASS, *Assistant Examiner.*